United States Patent
Kumar et al.

(10) Patent No.: US 10,607,017 B2
(45) Date of Patent: Mar. 31, 2020

(54) RESTRICTING ACCESS TO SENSITIVE DATA USING TOKENIZATION

(71) Applicant: CA, Inc., New York, NY (US)

(72) Inventors: Sharath L. Kumar, Bangalore (IN); Mohammed Mujeeb Kaladgi, Bangalore (IN); Rajendra Pachouri, Bangalore (IN); Mahesh Malatesh Chitragar, Bangalore (IN)

(73) Assignee: CA, INC., New York, NY (US)

( * ) Notice: Subject to any disclaimer, the term of this patent is extended or adjusted under 35 U.S.C. 154(b) by 231 days.

(21) Appl. No.: 15/397,935

(22) Filed: Jan. 4, 2017

(65) Prior Publication Data
US 2018/0189502 A1 Jul. 5, 2018

(51) Int. Cl.
*G06F 21/60* (2013.01)
*G06F 21/62* (2013.01)
(Continued)

(52) U.S. Cl.
CPC ........ *G06F 21/602* (2013.01); *G06F 21/6209* (2013.01); *G06F 21/6254* (2013.01); *H04L 9/0863* (2013.01); *G06F 21/335* (2013.01); *G06F 21/6218* (2013.01); *G06Q 20/34* (2013.01); *G06Q 20/36* (2013.01);
(Continued)

(58) Field of Classification Search
CPC ... H04L 9/0894; H04L 9/0891; H04L 9/0618; H04L 9/083; H04L 61/2596; H04L 63/0428; H04L 63/083; H04L 63/164; H04L 9/0625; H04L 63/10; G06Q 20/405; G06Q 20/3829; G06Q 20/34; G06Q 20/36;
(Continued)

(56) References Cited

U.S. PATENT DOCUMENTS 6,170,058 B1 * 1/2001 Kausik ................ G06F 21/6245
705/71
6,327,561 B1 12/2001 Smith et al.
(Continued)

FOREIGN PATENT DOCUMENTS

DE 102006021371 B4 4/2008

OTHER PUBLICATIONS

Consider Tokenization to Secure Sensitive Data by Kaizen Approach PP. 4; Jun. 16, 2016.*
(Continued)

*Primary Examiner* — Jeffrey C Pwu
*Assistant Examiner* — Ali H. Cheema
(74) *Attorney, Agent, or Firm* — Baker Botts L.L.P.

(57) ABSTRACT

A method includes receiving a security profile comprising user-defined rules for processing sensitive data, and identifying a plurality of sensitive data components in a data file according to the security profile. The method further includes generating a respective format-preserving token for each of the identified plurality of sensitive data components. The method additionally includes generating a corresponding token key for each of the respective-format preserving tokens, and replacing each of the plurality of sensitive data components in the data file with the respective format-preserving token. Further, the method includes cryptographically camouflaging each of the token keys using a first password and storing each of the cryptographically camouflaged token keys.

17 Claims, 6 Drawing Sheets

(51) Int. Cl.
*H04L 9/08* (2006.01)
*H04L 9/06* (2006.01)
*H04L 29/06* (2006.01)
*G06F 21/33* (2013.01)
*G06Q 20/36* (2012.01)
*G06Q 20/34* (2012.01)

(52) U.S. Cl.
CPC .......... *H04L 9/0618* (2013.01); *H04L 9/0625* (2013.01); *H04L 63/083* (2013.01); *H04L 63/10* (2013.01)

(58) Field of Classification Search
CPC .......... G06F 21/6209; G06F 17/30339; G06F 21/6245; G06F 21/335
USPC .................. 726/9, 26, 1; 713/168; 707/736; 705/65, 71, 41, 51; 380/44, 277
See application file for complete search history.

(56) References Cited

U.S. PATENT DOCUMENTS

| | | | | |
|---|---|---|---|---|
| 8,595,850 | B2* | 11/2013 | Spies | H04L 9/0625 |
| | | | | 705/71 |
| 8,694,646 | B1 | 4/2014 | Kothari et al. | |
| 8,726,398 | B1 | 5/2014 | Tock et al. | |
| 8,739,262 | B2* | 5/2014 | Harper | G06F 21/335 |
| | | | | 726/9 |
| 8,943,574 | B2 | 1/2015 | Bailey et al. | |
| 9,202,078 | B2 | 12/2015 | Abuelsaad et al. | |
| 9,946,895 | B1* | 4/2018 | Kruse | G06F 21/6245 |
| 10,025,941 | B1* | 7/2018 | Griffin | G06F 21/64 |
| 10,200,407 | B1* | 2/2019 | Dawkins | H04L 63/10 |
| 2002/0071560 | A1* | 6/2002 | Kurn | H04L 9/083 |
| | | | | 380/277 |
| 2012/0278897 | A1* | 11/2012 | Ang | H04L 61/2596 |
| | | | | 726/26 |
| 2012/0304273 | A1* | 11/2012 | Bailey | G06F 21/60 |
| | | | | 726/9 |
| 2012/0307999 | A1* | 12/2012 | Arnold | H04L 9/0894 |
| | | | | 380/44 |
| 2012/0321078 | A1* | 12/2012 | Chambers | H04L 9/0891 |
| | | | | 380/44 |
| 2013/0103685 | A1* | 4/2013 | Preneel | G06Q 20/34 |
| | | | | 707/736 |
| 2013/0297504 | A1* | 11/2013 | Nwokolo | G06Q 20/36 |
| | | | | 705/41 |
| 2014/0032417 | A1* | 1/2014 | Mattsson | G06F 21/6218 |
| | | | | 705/51 |
| 2015/0067327 | A1* | 3/2015 | Lipton | H04L 63/083 |
| | | | | 713/168 |
| 2015/0100495 | A1* | 4/2015 | Salama | G06Q 20/405 |
| | | | | 705/65 |
| 2016/0119296 | A1* | 4/2016 | Laxminarayanan | |
| | | | | H04L 63/0428 |
| | | | | 713/168 |
| 2016/0180338 | A1* | 6/2016 | Androulaki | G06Q 20/3829 |
| | | | | 705/71 |
| 2017/0214521 | A1* | 7/2017 | Busch | H04L 9/0618 |

OTHER PUBLICATIONS

Securing Non-Credit Card, Sensitive Consumer Data (Consumer Data Security for the Retail Sector) by William Newhouse pp. 12; May 5, 2016.*

A Primer on Payment Security Technologies: Encryption and Tokenization By: Tim Horton (Vice President, First Data) and Robert McMillon (Director, RSA—The Security Division of EMC) pp. 11 (Year: 2011).*

Consider Tokenization to Secure Sensitive Data by Kaizen Approach pp. 4; Jun. 16 (Year: 2016)*

Securing Non-Credit Card, Sensitive Consumer Data (Consumer Data Security for the Retail Sector) by William Newhouse pp. 11; May 5, (Year: 2016).*

* cited by examiner

| USER | SENSITIVE DATA COMPONENT | FORMAT | ACCESS LEVEL |
|---|---|---|---|
| JOHN SMITH | PRIMARY ACCOUNT NUMBER | XXXX XXXX XXXX XXXX | 3 |
| JOHN SMITH | SOCIAL SECURITY NUMBER | XXX-XX-XXXX | 3 |
| JOHN SMITH | TRANSACTION AMOUNT | $XX.XX | 1 |
| ... | ... | ... | ... |
| X | X | X | X |

| John Smith | ABC Bank - Registered Bank |
| 1 Main Street | PO Box 123 |
| New York, NY | New York, NY |
| 21212 | 21212 |

SSN: 986-22-9921 ─╱─ *202*

PAN: 5952 8672 1243 0964 ─╱─ *204*

Date of Statement: January 31, 2016

Bank Statement No. 5    *206*

| | Bank Statement for the period of: January 1, 2016 to January 31, 2016 ||||||
|---|---|---|---|---|---|---|
| Date | Transaction Description | Reference | Debit | Credit | Balance ||
| 01/01/2016 | Check | 01-01 | | $10,000 | $1,000 ||
| 01/02/2016 | Deposit | 01-02 | $20,000 | | $21,000 ||
| Definition of Codes | Deposit | Interest Received | Checks | Unpaid Checks | Other Debits | Bank Charges |
| CO - Commission | 20,000 | 0.00 | 10,000 | 0.00 | 0.00 | 45.00 |
| DO - Debit Order | Important Notice ||||||
| INT - Interest | |||||||
| SF - Service Fee | Statements are accepted as correct unless contested within 60 days. Any checks reflected on this statement, which are not attached, will be included in your next statement. ||||||
| UC - Unpaid Check | |||||||

FIG. 2

ORIGINAL SENSITIVE DATA (PAN)     8576 1125 0091 5438 — 204
FORMAT-PRESERVING TOKEN (PAN)     0952 8672 1243 0964 — 304

ORIGINAL SENSITVE DATA (SSN)      347-45-2281 — 202
FORMAT-PRESERVING TOKEN (SSN)     986-22-9921 — 302

John Smith  
1 Main Street  
New York, NY  
21212  
SSN: 986-22-9921 — 302  
PAN: 5952 8672 1243 0964 — 304

ABC Bank - Registered Bank  
PO Box 123  
New York, NY  
21212  
Date of Statement: January 31, 2016

Bank Statement No. 5

| Bank Statement for the period of: January 1, 2016 to January 31, 2016 |||||||
|---|---|---|---|---|---|---|
| Date | Transaction Description | Reference | Debit | Credit | Balance ||
| 01/01/2016 | Check | 01-01 | | $10,000 | $1,000 ||
| 01/02/2016 | Deposit | 01-02 | $20,000 | | $21,000 ||
| Definition of Codes | Deposit | Interest Received | Checks | Unpaid Checks | Other Debits | Bank Charges |
| CO - Commission | 20,000 | 0.00 | 10,000 | 0.00 | 0.00 | 45.00 |
| DO - Debit Order  INT - Interest  SF - Service Fee  UC - Unpaid Check | Important Notice  Statements are accepted as correct unless contested within 60 days. Any checks reflected on this statement, which are not attached, will be included in your next statement. ||||||

FIG. 4

RESTRICTING ACCESS TO SENSITIVE DATA USING TOKENIZATION

BACKGROUND

The present disclosure relates generally to data security, and more specifically, to restricting access to sensitive data using tokenization.

BRIEF SUMMARY

According to an aspect of the present disclosure, a method may include receiving a security profile containing several user-defined rules for processing various types of sensitive data, including financial data. The method may also include identifying sensitive data components in a data file according to the rules defined in the security profile. Further, the method may include Other features and advantages will be apparent to persons of ordinary skill in the art from the following detailed description and the accompanying drawings.

BRIEF DESCRIPTION OF THE DRAWINGS

Aspects of the present disclosure are illustrated by way of example and are not limited by the accompanying figures with like references indicating like elements.

FIG. 1 illustrates an example visualization of a security profile.

FIG. 2 illustrates an example data file containing sensitive data components.

FIG. 3 illustrates an example of format-preserving tokens.

FIG. 4 illustrates an example of a data file containing format-preserving tokens.

DETAILED DESCRIPTION

Figure 5:
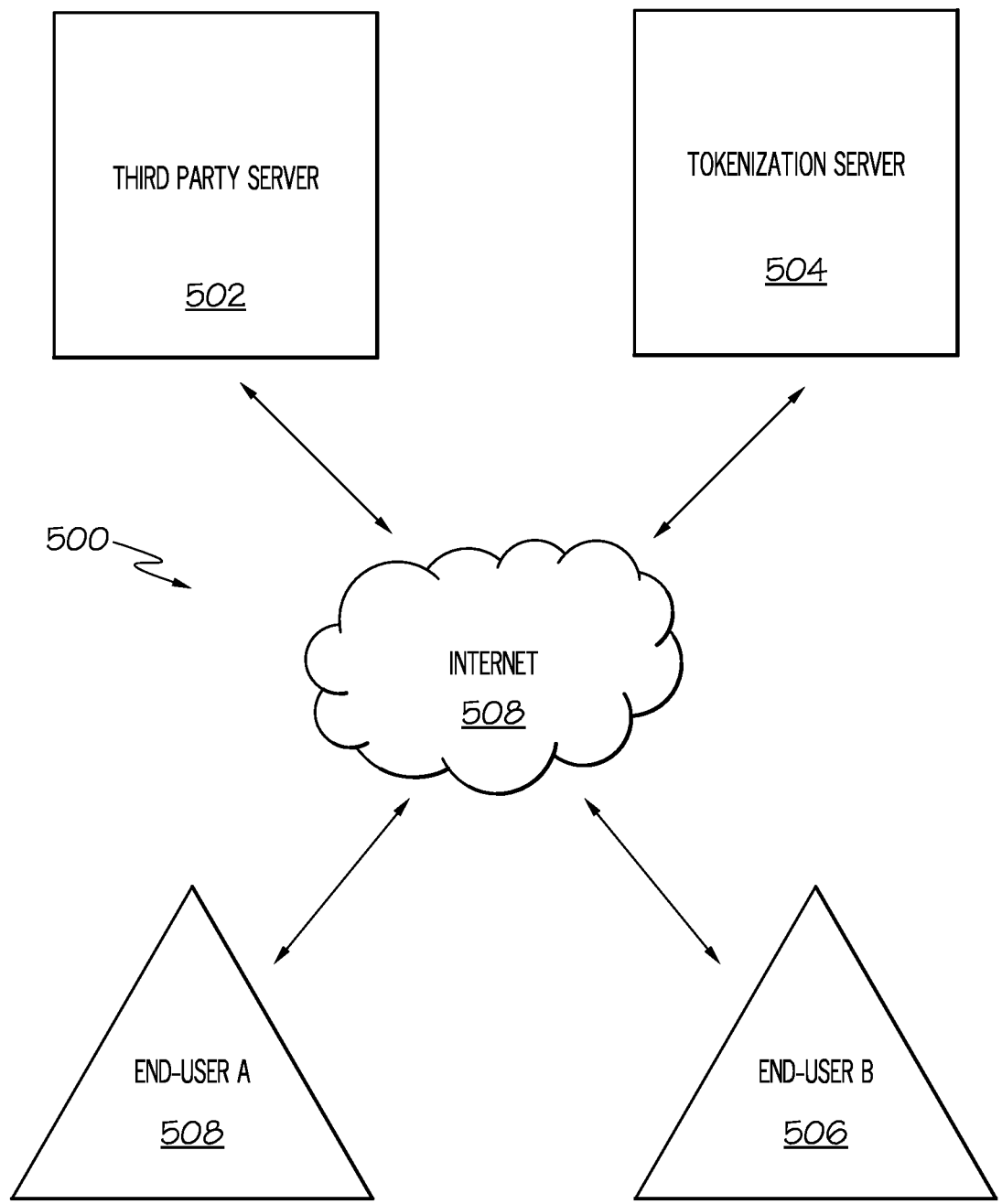
FIG. 5 is a schematic representation of a network.
Figure 6:
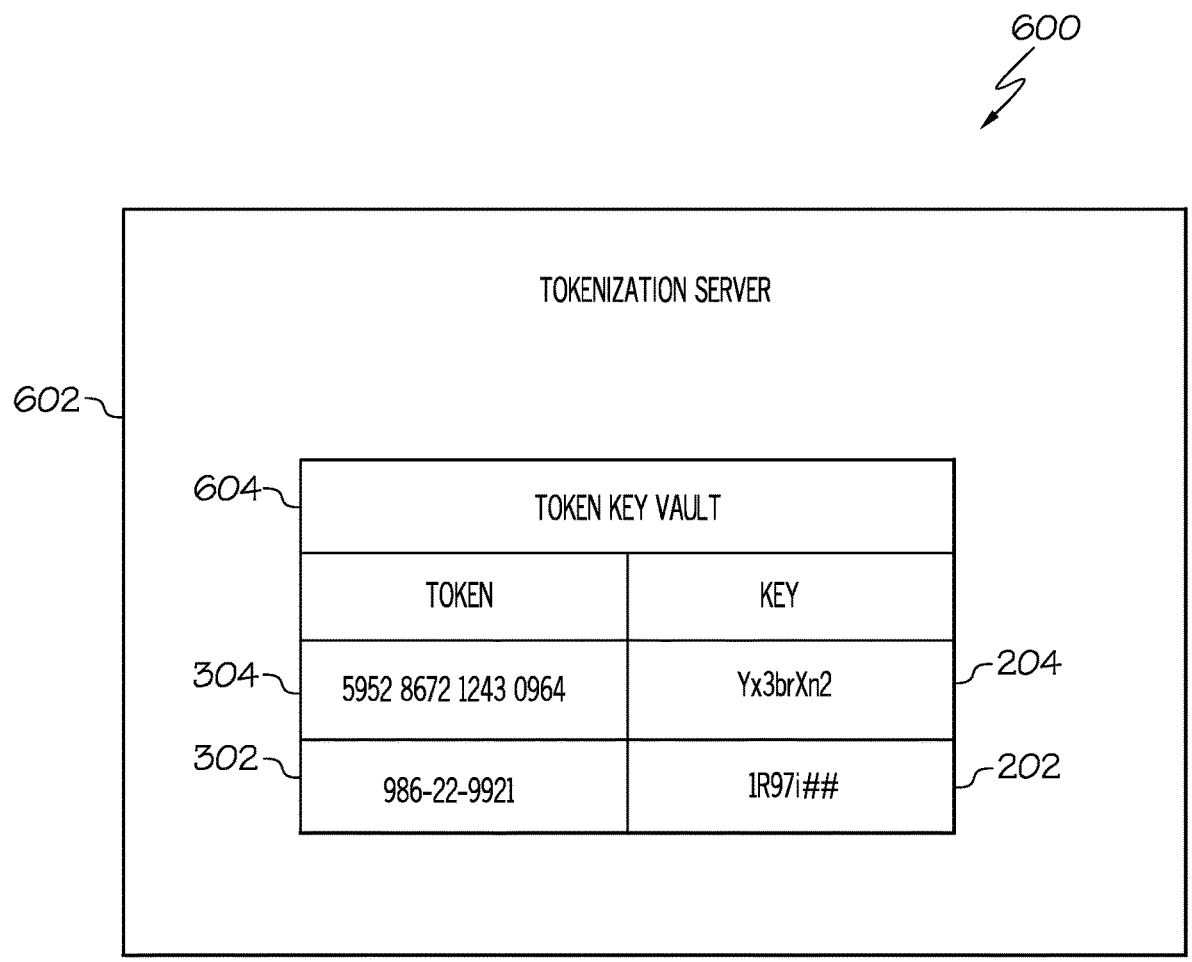
FIG. 6 illustrates an example of a tokenization server.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely in software (including firmware, resident software, micro-code, etc.) or in a combined software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would comprise the following: a portable computer diskette, a hard disk, a random access memory ("RAM"), a read-only memory ("ROM"), an erasable programmable read-only memory ("EPROM" or Flash memory), an appropriate optical fiber with a repeater, a portable compact disc read-only memory ("CD-ROM"), an optical storage device, a magnetic storage device, or any suitable combination of the foregoing. In the context of this document, a computer readable storage medium may be any tangible medium able to contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take a variety of forms comprising, but not limited to, electro-magnetic, optical, or a suitable combination thereof. A computer readable signal medium may be a computer readable medium that is not a computer readable storage medium and that is able to communicate, propagate, or transport a program for use by or in connection with an instruction execution system, apparatus, or device. Program code embodied on a computer readable signal medium may be transmitted using an appropriate medium, comprising but not limited to wireless, wireline, optical fiber cable, RF, etc., or any suitable combination of the foregoing.

Computer program code for carrying out operations for aspects of the present disclosure may be written in a combination of one or more programming languages, comprising an object oriented programming language such as JAVA®, SCALA®, SMALLTALK®, EIFFEL®, JADE®, EMERALD®, C++, C#, VB.NET, PYTHON® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY® and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider) or in a cloud computing environment or offered as a service such as a Software as a Service ("SaaS").

Aspects of the present disclosure are described herein with reference to flowchart illustrations and/or block diagrams of methods, apparatuses (e.g., systems), and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that, when executed, may direct a computer, other programmable data processing apparatus, or other devices to function in a particular manner, such that the instructions, when stored in the computer readable medium, produce an article of manufacture comprising instructions which, when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses, or other devices to produce a computer implemented process, such that the instructions which execute on the computer or other programmable apparatus provide processes for implementing the functions/acts specified in the flowchart and/or block diagram block or blocks.

As use of the Internet as a medium for communication and transfer of data has proliferated, an increased need to protect and restrict access to sensitive data is apparent. Generally speaking, data security refers to protecting data from unwanted destruction, manipulation, or actions by bad actors and other unauthorized users. Data security is commonly also referred to as information security or computer security. With persons and organizations of all types utilizing the Internet and other networks to transmit data, data security remains a top priority for individuals and organizations of every size and genre. Some exemplary organizations may include those involved in the fields of finance, medicine, technology, and others. Any time personal or consumer information is being transmitted or accessible via a network, private or public, secured or unsecured, that data must be protected from unwanted intrusion. Data security is not limited to data merely in transmission. Data security also refers to protecting data that is stored and accessible via a network such as the Internet. There are several known techniques to implement data security.

While certain example systems and methods disclosed herein may be described with reference to data security, tokenization, and restricting access to sensitive data, systems and methods disclosed herein may be related to any field. Moreover, certain examples disclosed herein may be described with respect to financial data or any other field that may involve sensitive information. Certain embodiments in the present disclosure are merely provided as example implementations of the systems and processes described herein.

One skilled in the art would appreciate that data which is not secure may be referred to as plaintext or cleartext. Each of these terms refers simply to data that is represented in its original state, for example not modified by any computational algorithm or disguised using any technique. On the other hand, ciphertext refers to encrypted plaintext or plaintext that has otherwise been hidden or disguised through another technique. In addition, and as used herein, a data file 200 can refer to a document, spreadsheet, presentation, note, email, message, image, text, or otherwise as is known in the art. In certain embodiments, data files may be comprised of data components. In certain embodiments, the data components may be sensitive data or non-sensitive data components. An example of sensitive data component 104 may be a social security number, bank routing number or account number, birthdate, age, name, address, or any other data the user specifies is sensitive in a security profile 100. In certain embodiments, a security profile 100 may comprise one or more rules for processing sensitive data. For example, the security profile 100 may contain a rule identifying social security numbers as sensitive. In certain embodiments, the security profile 100 may be stored on a user-basis and contain user-specific rules.

Two particular types of data security described herein include encryption and tokenization. While many often confuse or conflate these two techniques, there are important differences between the two. First, encryption generally refers to applying a mathematical or statistical algorithm to information so that only authorized users can decode it and read it. Encryption, like other data security techniques, does not prevent the encrypted information being intercepted by an unauthorized party; but rather, denies the unauthorized party from accessing the true content of the information or cleartext. Encrypted information may appear in many forms, such as hexadecimal in form or Base64. The mathematical or statistical algorithm for encrypting information is generally represented by a cipher. The cipher will perform a specific series of steps on the unencrypted information to generate the ciphertext. Because encryption techniques generally involve a series of statistical or mathematical steps, in principal it is computationally possible to decrypt the information without possessing the key when certain algorithms or ciphers are utilized. Some encryption techniques are more secure than others. However, for a well-designed encryption scheme, enormous computational power and resources and advanced skill are required to access the information without the decryption key, i.e., crack the cipher.

Two genres of encryption using keys are commonly referred to as symmetric key and asymmetric key. In symmetric key encryption, the encryption key and the decryption keys are identical and that key both encrypts and decrypts the information. In symmetric key encryption, each of the communicating parties or entities must be in possession of the same key prior to encrypting or decrypting the information. A major concern or drawback of symmetric key encryption is distribution of the symmetric key to both the sending and receiving parties. In practice, the keys are distributed using a secure channel. However, if an unauthorized entity intercepts the secret symmetric key in transit to the intended recipient of the information, the unauthorized entity will be able to decrypt and access all encrypted information sent between the intended sender and intended recipient, thereby compromising the data security. There are several known types of symmetric ciphers or symmetric key encryption techniques, including but not limited to AES, DES, 3DES, RC4, CASTS, Twofish, Serpent, Skipjack, and IDEA.

Asymmetric encryption was developed to overcome the need to distribute a secret key and thus overcomes that vulnerability to private key encryption. In asymmetric encryption, sometimes referred to as public-key encryption, there are two different keys. The first key is the public key, which is published for anyone to use and encrypt messages. Often, a public key can be looked up in a public key register maintained by a security organization. The second key is the private key, which is kept secret by each user or the receiving party. Messages encrypted with a public key can only be decrypted using the private key, and messages encrypted with the private key can only be decrypted using the public key.

Consider the following examples to understand some common uses of asymmetric encryption. Referring to FIG. 5, end-user A 508 desires to send encrypted information to end-user B 506 that only user B can access. User A obtains user B's public key from a registry or other location and encrypts the message using user B's public key. Only user B's private key can decrypt that information. Thus, because user B's private key is kept secret by user B, only user B will be able to decrypt the information. If an unauthorized entity intercepts the encrypted information, it is statistically unlikely the cleartext or true information can be ascertained. Upon receipt of the information, user B will apply his or her private key to the encrypted information and will obtain the cleartext or unencrypted information securely. Another use of public key encryption is commonly in the field of digital signatures. For example, consider the situation where user B wants to send information to user A such that user A can be sure that user B was the sender of the information. User B can encrypt the information with his or her private key prior to transmission. That information is then only decipherable by applying user B's public key, which is typically widely accessible. Because user B's public key is widely accessible, the contents of that message are not secure during transmission simply by encrypting the message with user B's private key. However, because user B is the only entity in possession of the user B private key, a message encrypted using user B's private key is assumed to only have been sent by user B. Thus, this use of public key encryption provides a technique for authentication. With the use of public key encryption, and in either example provided above, protecting private keys is a major security concern. If a user's private key is obtained by an unauthorized entity, security of any message encrypted using the private key or corresponding public key is compromised. A well-known technique for public key encryption is referred to as Pretty Good Privacy (PGP). To address the drawbacks of encryption and the need to protect a key, typical practice is to rotate keys periodically so that if a key is compromised only data encrypted under that key is compromised.

One major drawback of encryption is that in most situations encryption affects transparency and field validation, meaning the encrypted data no longer resembles even the format of the original data and thereby affects typical functions such as sorting data or searching data. For example, a credit card processing system is expecting to receive a credit card number that is sixteen digits long. However, the encrypted credit card number could be tens of digits long containing numbers and letters because encryption techniques commonly produce encrypted text in hexadecimal or Base64. When the credit card processing system receives the credit card number in its encrypted format, it will not be able to process it and will malfunction or reject the information. To address this drawback to most types of encryption, new format-preserving techniques have been developed, as well as order-preserving and searchable encryption protocols. A major consideration for businesses in the age of digital information is the tradeoff between application functionality and strength of encryption. Along with the new encryption techniques, tokenization is another technique for protecting sensitive data that offers a solution to the problems of transparency and field validation.

As was stated before, every encryption technique is merely a series of steps or mathematical operations that are performed on the data. Running the same series of steps or mathematical operation over and over again, by itself, would not be secure because there are only one hundred and twenty eight different ASCII characters (American Standard Code for Information Interchange) and it would take little time for a malicious actor to input each of the different characters into the encryption algorithm and map the input to the output. This is known as a chosen-plaintext attack, where the attacker has chosen the plaintext sample and obtains the corresponding ciphertext. To prevent against such attacks, encryption techniques are performed according to a key or password that is chosen by a user or system. This makes it difficult for an attacker to do a chosen-plaintext attack unless they have the key or password. That is because although the encryption algorithm is at a high level the same, if performed according to two different keys, two different outputs are obtained. For example, suppose two different users want to encrypt the same data file 200 according to the AES encryption algorithm. The first user encrypts the file using AES and the key "Uc4ntCm3" and the second user encrypts the file using the same encryption algorithm but the key "2T0Bo$$." Despite the users using the same encryption algorithm on the same data file, their output or ciphertext will be entirely different because they used different keys.

However, if the same encryption algorithm and the same key are used time and time again, the encryption is still susceptible to attack. For example, if a malicious intruder has enough computational power and patience, he or she could still perform other attacks such as a ciphertext-only attack or chosen-ciphertext attacks and eventually derive the encryption key and thereby compromise security. As was stated before, it is common practice to rotate keys or passwords so that even if a malicious attacker is able to derive a particular key, only the data encrypted under that key will be compromised. To make encryption even less vulnerable to attack however, initialization vectors are often used in combination with the key or password.

Initialization vectors are random or pseudo random values that can be used in conjunction with the encryption key or password to strengthen security. The initialization vector is only used a single time. Therefore, even if the same key is used, as long as it is used in conjunction with a random or pseudo random initialization vector then the threat from an attacks is greatly reduced because even encrypting the same data with the same key and the same algorithm will produce different results because the initialization vector is different with every use. In other words, the initialization vector serves to prevent repetition thereby making it more difficult for an attacker to identify patterns to crack the algorithm. Another key benefit of using an initialization vector is demonstrated in the case of financial statements. In a financial statement several data components of the data file 200 are likely to be repeated and the same in each statement, for example, the account number, bank name, routing numbers, social security numbers, and the like. Without an initialization vector an attacker viewing the encrypted statements could identify repeated portions of the encrypted data because under the same key and the same encryption algorithm the account number, bank name, routing number, and social security number would result in the same ciphertext. Such patterns can compromise security. Using an initialization vector in combination with the key however introduces randomness and in every statement the account number, bank name, routing number and social security number would produce different ciphertext and no patterns could be identified.

In certain embodiments, the initialization vector may be random, however, that is not always possible for certain applications and it is extremely difficult to generate and remember truly random initialization vectors. Generally, any value can be used as an initialization vector. However, one must be aware that the initialization vector must be known by both users and thus it must be transmitted along with the encrypted data to a receiving user. Transmitting the initialization vector and the encrypted data together can severely compromise the data security. But there are certain techniques to alleviate those concerns. For example, data from the information to be encrypted may be used as the initialization vector. In such a case, in the field of financial data, certain fields in the payment information can be used as an initialization vector, such as the date and time of the transaction. Moreover, the methods and systems disclosed herein provide a novel technique for distributing a key and initialization vector through the combination of format-preserving encryption and tokenization.

Although technically less secure than other encryption techniques due to the constriction on format or structure, format-preserving encryption (FPE) refers to encrypting the data in such a way that the ciphertext has the same format, structure, or features as the plaintext. However, the loss in computational security may be ameliorated by the fact that the ciphertext is disguised as plaintext, which adds yet another layer of security to the encryption algorithm itself. FPE is applied at different levels. For example, if the cleartext is a ten-digit number, that number encrypted using FPE would be another ten-digit number. If the cleartext is a nine-digit social security number with hyphens after the third and fifth digits, the format preserved encrypted data must be another nine-digit number with hyphens after the third and fifth digits. In a more complex case however, there are more particular aspects of the original cleartext that must be preserved. Take the example of primary account numbers (PAN) used in banking software. Each digit in a PAN has particular meaning. The first digit identifies the type of credit card. For example, all American Express card numbers begin with a three, Visa cards begin with a four, and Discover cards begin with a six. The first six digits identify the credit card network that will process the credit card, for example, 401100 will be processed by a particular Visa payment network. The last digit is a checksum. Moreover, a PAN will only be verified by some payment processing systems or networks if it passes what is known as the Luhn test. The Luhn test is a validation technique that verifies a card number against the included checksum digit. Therefore, in certain systems checking each card number with the Luhn algorithm, the encrypted format must likewise pass the Luhn test. This introduces complexity into the encryption scheme.

Not all FPE techniques are equal and the quality of an FPE algorithm is determined by whether an attacker can distinguish information encrypted using FPE from a truly random permutation. Ideally, an FPE cipher, and any cipher or encryption algorithm for that matter would be a random permutation, but for larger domains and applications it is complex and difficult to generate and remember a truly random permutation. Therefore, as is often the case, a pseudo random permutation (PRP) is generated using a secret key, often in conjunction with an initialization vector.

Tokenization is fundamentally different from encryption. First however, one of skill the art would appreciate that a token can be a representation of something else. In the case of encryption, a token is often referred to as a data or placeholder for another piece of data that the user desires to hide or is sensitive in nature. Therefore, rather than encrypting the sensitive data by manipulating it through mathematical steps, tokenization simply replaces it with another value that has no meaning or sensitivity to the user. In other words, tokenization describes the process of substituting sensitive data components with non-sensitive data components. As such, and unlike encryption where encrypted data can be decrypted with a formula, there is no decryption of a token. Tokens typically have no mathematical or statistical relationship to the data they represent. Tokenization is ordinarily based on randomness, not a mathematical formula. Unlike an encryption key, which compromises all data encrypted with that key if obtained by an attacker, a token may useless to the attacker because there is no way to derive the plaintext from the token value. Therefore, with tokenization the threat of an attacker deriving the key from comparing plaintext and ciphertext is eliminated.

A token can take many forms. In certain embodiments, a token can simply anonymize the data through a series of nonce placeholders such as asterisks, or take many other forms. In other embodiments, for example, a token could appear as random letters and numbers, or it could be a uniform word such as "redacted." The appearance of the token does not affect the security of the token system 600, however, formatting tokens in certain ways can provide several benefits. For example, in some embodiments, a token may be a format-preserving token, meaning that the token and the underlying data share similar characteristics. In some embodiments, the token and the underlying data may be virtually indistinguishable in form or structure. Thus, much like format preserving encryption discussed above, the token will be able to pass through legacy systems with greater transparency and will not affect data validation. In addition, format-preserving tokens disguise the fact that the document is protected. To an attacker, a document in which format-preserving tokens have replaced some or all sensitive data components in a data file 200 would appear as a clear document, and thus the attacker has no way to know whether they are viewing ciphertext or cleartext.

Because one typically cannot derive the underlying data from the token itself, tokenization schemes may use a lookup table or codebook. The lookup table may be used by the tokenization server 504 to search for a particular token in a database and identify one or more other pieces of data associated with that token in the database. In certain embodiments, the token system 600 is administered by a token service provider running a tokenization server 504 and a token vault 604. In such embodiments, the security and risk reduction which accompanies tokenization may require that the token system 600 be located remotely from the systems that previously processed or stored the sensitive information replaced by the tokens. In some embodiments however, tokenization servers 504 $s$ may be maintained locally, albeit in a secure or isolated segment of the network or data room.

The typical scheme of a token system 600 is that first a token requestor or user requests a token from the tokenization server 504. The token service provider then generates a random token, and assigns a pre-specified expiration date to the token. The token will then be used until the expiration date. One limitation of this approach is that the token requestor or the user requesting the token must be online to request the token from the token service provider. One alternative is to pre-populate the device with a limited number of tokens; however, such an approach is inefficient and results in additional overhead for the token service provider. Moreover, pre-population of tokens also increases the possibility of tokens being compromised and creates a need for additional storage of tokens on the device. In traditional tokenization schemes, only the tokenization server 504 tokenizes data to create tokens and detokenizes data.

Deviating from typical applications of token schemes, certain embodiments of the present disclosure utilize FPE to generate the tokens. Thus, in certain embodiments, the tokens are mathematically related to and derivable from the encrypted data. Moreover, because certain embodiments utilize FPE to generate the tokens, the keys used to generate the token in those embodiments may be transmitted to the tokenization server 504. Using FPE to generate the tokens provides the added advantage that the tokens can be generated on the end-user device itself, if a pseudo random initialization vector is utilized. In addition, if the tokens preserve the format of the data they represent then they are able to travel inside most application, databases and systems without detection as tokens and without malfunction. However, similar to the discussion above of the danger of transmitting the encrypted data along with the initialization vector, there is similar danger and increased risk for compromising the encrypted data when the token is transmitted with the keys used in the FPE algorithm which generated the tokens. However, certain embodiments of the systems and methods disclosed herein provide a solution to that problem by utilizing cryptographic camouflage techniques to encrypt the token keys and provide a novel architecture for combing tokenization and format-preserving encryption.

Cryptographic camouflage, like FPE, adds yet another layer of disguise to the encrypted data. Certain embodiments of the systems and methods described herein utilize cryptographic camouflage techniques. Application of cryptographic camouflage is most easily understood through the following example comparing encryption under a standard encryption algorithm and encryption using cryptographic camouflage. Suppose a user in this example desires to encrypt their secret key. In this example, the user's key is "Peter Piper picked a peck of pickled peppers." Under the conventional encryption approach, the encrypted key is "5065746572205069706572207069636b656420612." If an attacker attempts to decrypt the key with the wrong password, it yields an unreadable sentence such as "ERrr9723459p09u34jjo0i09HJpy89phKLJ." If the attacker attempts to decrypt the key with the correct password, the original key "Peter Piper picked a peck of pickled peppers" is revealed. In this example of encryption under traditional encryption methods, the attacker can see from the fact that it is a well-formed English sentence that they have found the password. Thus, the attacker could repeatedly guess the password until readable English text is eventually produced. That is known as the brute-force attack. To prevent against such attacks, cryptographic camouflage operates in a different manor.

Continuing with the example, if the user encrypts the key "Peter Piper picked a peck of pickled peppers" using cryptographic camouflage, the encrypted key again is "5065746572205069706572207069636b656420612," the same as under conventional encryption. Also like conventional encryption, an attacker attempting to decrypt the key with the correct password will reveal the correct key "Peter Piper picked a peck of pickled peppers." The difference lies in what is yielded from attempting to decrypt the key with an incorrect password. When cryptographic camouflage is used, decryption with an incorrect password would reveal a different key, such as "Can you can a can as a canner can can a can" or "I saw Susie sitting in a shoe shine shop." In other words, rather than produce unreadable text when decryption occurs with an incorrect password, incorrect but readable English sentences are produced. Therefore, an attacker is unable to determine from the decrypted result whether he or she has entered the correct password because no matter what password is entered, correct or incorrect, seemingly-correct output is produced. The attacker can no longer repeatedly input passwords until they obtain a key that does not look like scrambled text. Cryptographic camouflage therefore makes it more difficult for an attacker to brute-force attack the encrypted key. Cryptographic camouflaging techniques are disclosed, for example, in U.S. Pat. No. 6,170,058 to Kausik, the disclosure of which is hereby incorporated by reference as if fully set forth herein.

As has been mentioned herein, encryption utilizes keys, which in certain embodiments can be strings of readable text. As in the example above, a key could be "Peter Piper picked a peck of pickled peppers." But a key could also in certain embodiments be a generated Personal Identification Number (PIN), or a random string of text and/or numbers. A key could be generated by a computer or chosen by a user. In certain embodiments described herein, sensitive data may be encrypted using a format-preserving encryption algorithm and a key. In such embodiments, because the encrypted version of the sensitive data component 104 is used as a token, the key used in the format-preserving encryption algorithm may be referred to as a token key. In other embodiments however, the token key may comprise a pair value including the token and the token key. If such a token key were generated and transmitted to the tokenization server, the token vault would contain a lookup table upon which the server could look up the token the requestor desires to be detokenized and rather than return the corresponding true value, in certain systems and methods disclosed herein, the tokenization server would merely return the token key in the same state it was transmitted to the tokenization server back to the requestor.

Figure 7:
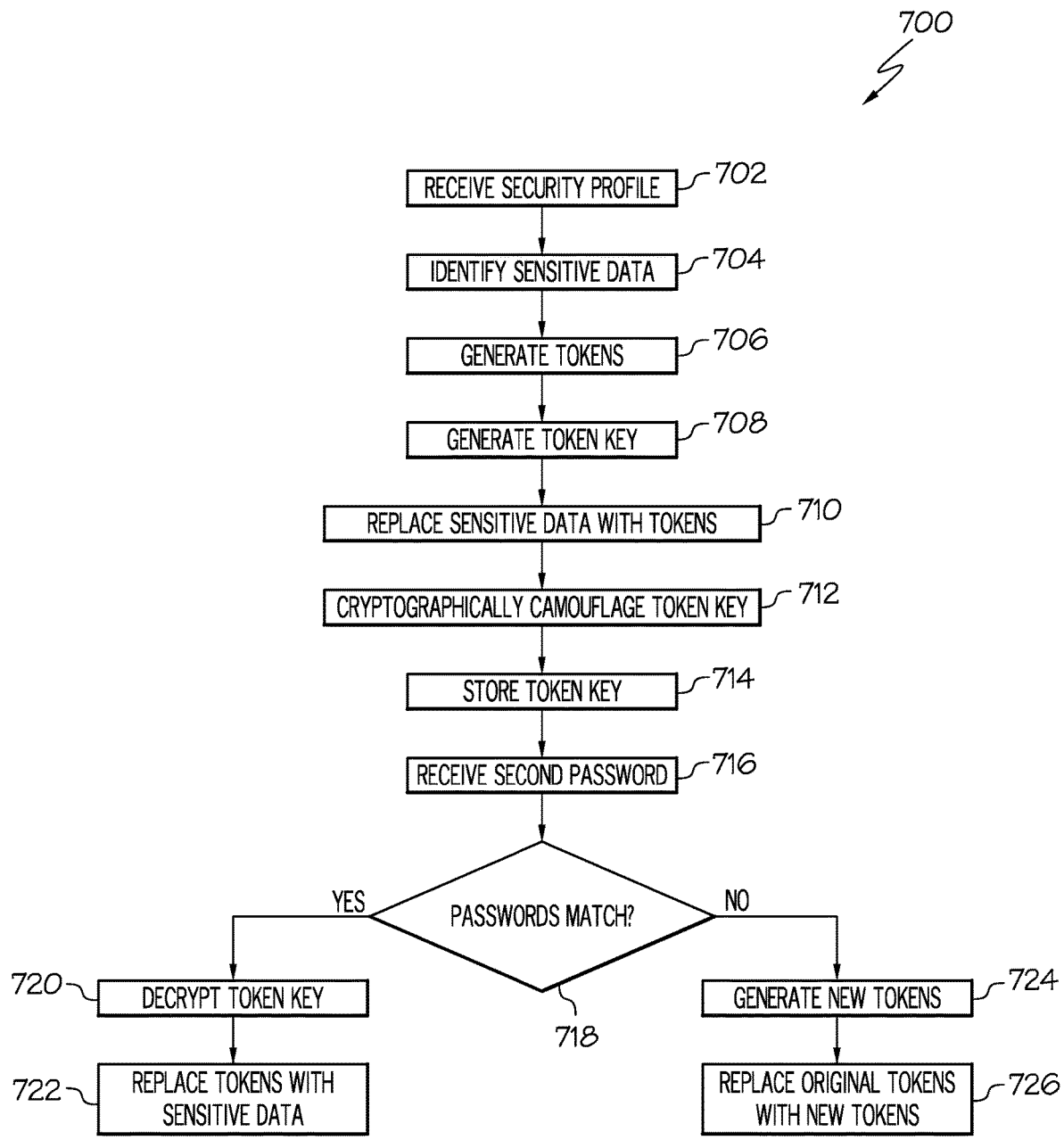
FIG. 7 illustrates an example of a method for restricting access to sensitive data.

In light of the concepts and techniques referred to above, and with reference to FIG. 7, a method for restricting access to sensitive data 700 is now described. First, in Step 700 a security profile 100 is received. The security profile 100 may contain user-defined rules according to which sensitive data in a data file 200 will be processed. Thus, the user 102 may in certain embodiments create a security profile 100 that effectively instructs a processor which sensitive data components to protect. In other embodiments, certain access levels 108 can be specified for each rule. For example, a user 102 could specify that social security numbers are a sensitive data component 104 and must be protected at high levels in a specific format 106. Such high levels could correspond to different levels of anonymization. In certain embodiments, the processor may then process the data file 200 and identify one or more sensitive data components in the data file 200 according to the security profile 100. For example, in FIG. 1 a user 102 John Smith has specified that social security numbers are sensitive data components. Therefore, if John Smith wants to restrict access to the sensitive data components of a data file 200 such as that illustrated in FIG. 2, the social security number data component 202 will be identified and processed according to John Smith's security profile 100, which instructs the processor to tokenize the social security number. In certain embodiments, two or more sensitive data components may be identified in the data file 200 according to the security profile 100, such as the PAN. In this example, because John Smith did not specify that certain data components such as the transaction date are sensitive data components, the date field may not be identified as a sensitive data component 104 in Step 704. Thus, it is up to the user or other predefined policies to decide which data components are sensitive or non-sensitive.

After all of the sensitive data components have been identified in Step 704, respective format-preserving tokens may be generated for each of the sensitive data components in step 706. As described herein, in certain embodiments the respective format-preserving tokens may be generated in Step 706 by encrypting the sensitive data components according to a FPE technique using an encryption key such as a token key. In such embodiments, the encrypted data component is used as the format-preserving token. In addition, certain embodiments utilize an initialization vector in generating the format-preserving token 302 so that the encryption algorithm has randomness and is more secure. The initialization vector can be based on a random or nonce value, or it can be based on known values. For example, the initialization vector could be based on a data component in the data file 200 itself, such as a transaction date, or it could be based on a prime number. In such embodiments wherein the initialization vector is based on a data component in the data file 200 itself, it may be based on any non-sensitive data component, i.e., one that is not specified as sensitive in the security profile 100 or otherwise known to be sensitive. In such an embodiment, the format-preserving token 302 can be generated on the end-user device, thereby alleviating the need for the end-user device to be network connected in order to request the tokenization server 504 to generate tokens. In other embodiments, the format-preserving tokens may be generated on a tokenization server. Moreover, certain embodiments may use some other format-preserving technique to generate the format-preserving token, as are well known in the art, such as randomization techniques and certain feistel ciphers. As was stated above, in Step 708 a token key corresponding to each format-preserving token 302 is generated. In certain embodiments described herein, the token key may be generated according to a user's preferences and/or input. In other embodiments, a token key may be generated according to a random PIN. In yet other embodiments, at Step 708 the token key may be generated by generating a pair data value comprised of the encryption key input by the user and the corresponding format-preserving token value itself.

In Step 710 the sensitive data components in the data file 200 are replaced with the respective format-preserving tokens, thereby producing a secured or tokenized data file 400, as is depicted in FIG. 4. In the embodiment illustrated in FIG. 4, one of skill in the art would appreciate how the social security number 202 was replaced by the format-preserving token 302, which appears identical in format to the true social security number 202. The same is true with regard to the sensitive PAN data component 204 in FIG. 2 being replaced in FIG. 4 with the format-preserving token for the PAN data. Thus, to an attacker, the data file 200 would appear to be unsecured and the attacker may believe that the social security number and PAN represented in the document are the true data values. Although not depicted in FIG. 2 and FIG. 3, other data components may be replaced by format-preserving tokens and the systems and methods disclosed herein place no limitation on the number of sensitive data components that are replaced in a data file 200 with format-preserving tokens. FIG. 2 and FIG. 3 represent just one embodiment wherein the social security number data component 202 is a first sensitive data component 104 and the PAN data component 204 is a second sensitive data component. FIG. 3 then shows the secured data file 400 wherein the first and second sensitive data components have been replaced with first and second format-preserving tokens. As can be seen from this particular embodiment, the first and second respective format-preserving tokens preserve different formats. That is, in this embodiment, the first sensitive data component 104 is a social security number and the second sensitive data component 104 is a PAN, and the first format-preserving token is visually indistinguishable from a valid social security number and the second format-preserving token is visually indistinguishable from a valid PAN. Thus, the systems and methods disclosed herein provide a technique for selectively protecting certain aspects of a data file wherein different aspects adhere to different formats.

In Step 712 each token key is cryptographically camouflaged. In certain embodiments, the cryptographically camouflaged token keys 606 may be cryptographically camouflaged using a password. In certain embodiments, there may be a first password and a second password. In such embodiments, the first password could represent the correct password chosen by the originating user and the second password could be a password that was chosen by an attacker or another individual. The password may be chosen by the user or the computer or otherwise determined using known techniques. In such embodiments, the token key is only obtainable by input of the correct password.

In Step 714 each of the cryptographically camouflaged token keys is stored. In certain embodiments the cryptographically camouflaged token key is stored on a tokenization server 504 maintained by the token service provider or some other third party. In certain embodiments, the cryptographically camouflaged token keys 606 may be stored in a token vault 604 maintained by the token service provider. In those embodiments wherein the cryptographically camouflaged token key is stored on a tokenization server 504 but were generated on the end-user device they may be transmitted from the end-user device to the tokenization server. In certain embodiments, the systems and methods herein do not transmit the raw or clear data that the token represents to the tokenization server; rather, in certain embodiments only the token key is transmitted to the tokenization server.

In some embodiments the tokenization server 504 is remote from the end-user device, and communication between the end-user device and the tokenization server occurs over a network such as the Internet 508. In certain other embodiments however, the cryptographically camouflaged token keys 606 could be stored on the user device, or stored on a third-party server 502. In embodiments where the cryptographically camouflaged token key is stored remotely, it may be stored in a remote part of a local data center. Moreover, there may be several users communicating with the tokenization server, for example end-user 1 and end-user 2.

In Step 716, either an attacker or authorized user may input a second password, which is then received. The second password may be received at an end-user device or the tokenization server. Upon receipt of the second password in Step 716, the process then determines whether the passwords are equal in Step 718. In certain embodiments, determining whether the passwords are equal may comprise one or more steps. For example, it could comprise merely receiving a checksum indicating that the two values or equal, or it could comprise determining the first password and comparing the second password to the first password. There are several ways to distribute the password. For example, if end-user A desired to send a secure file to end-user B using the methods and systems described herein, end-user A could simply telephone end-user B and tell him the password. Or, in other embodiments, end-user A could deliver the password to end-user B using some other well-known technique or secure channel. Depending on whether the passwords are equal in Step 718, the process branches. In yet other embodiments the first password will need to be obtained by interrogating the tokenization server. In embodiments such as this, the tokenization server 504 may use a map or lookup table to search for the token and then return the token key, which in some embodiments may be cryptographically camouflaged.

If it is determined in Step 718 that the first password and the second password are equal, then the correct token key or keys are decrypted using the first password and the user is in possession of the correct token key. In certain embodiments the receiving user, in our example end-user B, would need to request the token key from the tokenization server 504 using the first password. The tokenization server 504 then may determine whether the passwords are equal in Step 716 and then subsequently decrypt the token key in Step 720. In other embodiments however, upon request the cryptographically camouflaged token key could be delivered to the end-user 2 and the end-user device could determine whether the first and second passwords are equal in Step 718 and decrypt the token key in Step 720. In either example however, using the correct password to decrypt the cryptographically camouflaged token key will result in obtaining the correct and true token key. In embodiments wherein the format-preserving tokens are generated by encrypting the sensitive data component 104 using an FPE technique, the token key can be used to decrypt each of the format-preserving tokens and reveal the cleartext or true value. Thus, at Step 722 the respective format-preserving tokens in the data file 200 may be replaced with the corresponding sensitive data component.

Upon receiving the second password in Step 716 and determining in step 718 that the password is incorrect, an incorrect but legible token key is obtained because the token key was encrypted using cryptographic camouflage. As such, the attacker will not know that they have obtained an incorrect key because the key will appear as a readable string rather than scrambled text and/or numbers and symbols. However, if the attacker then requests the tokenization server 504, or some other entity such an end-user device, to detokenize the data file 200 using the incorrect key, the attacker could nonetheless know that the incorrect key was obtained because the document will not be detokenized, and in some embodiments, the attacker would observe no change to the data file 200.

Although such an embodiment introduces a two-step process to the brute-force attack and thereby makes it more difficult, some embodiments present a further solution. In certain embodiments, upon entering an incorrect password to decrypt the cryptographically camouflaged token keys 606 at steps 716 an incorrect token key may be presented to the attacker, but when the attacker requests the tokenization server 504 to detokenize the data file 200, a new format-preserving token is generated for each of the format-preserving tokens in the data file 200 at step 724. Then, at step 726, the original format-preserving tokens in the data file 200 are replaced with the new format-preserving tokens. In such an embodiment, the attacker will not know that an incorrect key was input because the data file 200 changed, thereby giving the appearance that the detokenization was successful. However, because the original format-preserving tokens were merely replaced with new format-preserving tokens in Step 726, the data file 200 that the attacker is viewing does not contain the sensitive data components. In this embodiment, the brute-force attack is effectively thwarted.

The systems and methods disclosed herein may interact with a user or users through, for example, a computer terminal such as a laptop, notebook, desktop, smartphone, or tablet, or similar computing device. In such an embodiment, information may be presented to a user on a visual screen. A visual screen may be a monitor, television, display, or similar electronic device using, for example, LCD, LED, CRT, PDP, Laser, OLED, AMOLED, Retina, or other similar technology.

The terminology used herein is for the purpose of describing particular aspects only and is not intended to be limiting of the disclosure. As used herein, the singular forms "a," "an," and "the" are intended to comprise the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of means or step plus function elements in the claims below are intended to comprise any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. For example, this disclosure comprises possible combinations of the various elements and features disclosed herein, and the particular elements and features presented in the claims and disclosed above may be combined with each other in other ways within the scope of the application, such that the application should be recognized as also directed to other embodiments comprising other possible combinations. The aspects of the disclosure herein were chosen and described in order to best explain the principles of the disclosure and the practical application and to enable others of ordinary skill in the art to understand the disclosure with various modifications as are suited to the particular use contemplated.

What is claimed:

1. A method comprising:
   receiving a security profile comprising user-defined rules for processing sensitive data; identifying a plurality of sensitive data components in a data file according to the security profile;
   generating a respective format-preserving token for each of the identified plurality of sensitive data components on an end-user device that is remote from a tokenization server;
   generating a corresponding token key for each of the respective format-preserving tokens;
   replacing each of the plurality of sensitive data components in the data file with the respective format-preserving token;
   wherein the plurality of sensitive data components comprise a first sensitive data component associated with a first respective format-preserving token, and a second sensitive data component associated with a second respective format-preserving token, and wherein the first and second respective format-preserving tokens preserve different formats;
   cryptographically camouflaging each of the token keys using a first password;
   transmitting each of the cryptographically camouflaged token keys from the end-user device to the tokenization server; and
   storing each of the cryptographically camouflaged token keys.

2. The method of claim 1, further comprising:
   receiving a second password;
   determining whether the first password is equal to the second password; and
   in response to determining that the first and second password are equal:

decrypting each of the corresponding token keys; and
replacing each respective format-preserving token in the data file with the respective sensitive data components.

3. The method of claim 1, wherein the respective format-preserving tokens are original format-preserving tokens, and further comprising:
receiving a second password;
determining whether the first password is equal to the second password; and
in response to determining that the first and second password are not equal:
generating a new respective format-preserving token for each of the plurality of sensitive data components; and
replacing each original format-preserving token in the data file with the respective new format-preserving token.

4. The method of claim 2, wherein determining whether the first and second passwords are equal comprises:
receiving the second password at an end-user device;
determining the first password; and
comparing the second password to the first password.

5. The method of claim 1, wherein said generating the respective format-preserving token for each of the plurality of sensitive data components is based on respective initialization vectors.

6. The method of claim 5, wherein the respective initialization vectors are comprised of a prime number and an expiration date.

7. The method of claim 5, wherein the data file further comprises a plurality of non-sensitive data components and wherein the respective initialization vectors are comprised of one of the non-sensitive data components.

8. The method of claim 1, wherein the plurality of sensitive data components comprise first and second sensitive data components, and wherein the first sensitive data component comprises a valid primary account number and the second sensitive data component comprises a social security number, and wherein the first respective format-preserving token is visually indistinguishable from a valid primary account number and the second respective format-preserving token is visually indistinguishable from a valid social security number.

9. The method of claim 1, wherein the corresponding token key for each of the format-preserving tokens comprises an encryption key and the respective format-preserving token.

10. A computer comprising:
one or more processors; and
a non-transitory computer-readable storage medium storing computer-readable instructions that are executable by the one or more processors to perform:
receiving a security profile comprising user-defined rules for identifying and processing sensitive data;
identifying a plurality of sensitive data components in a data file according to the security profile;
generating a respective format-preserving token for each of the identified plurality of sensitive data components on an end-user device that is remote from a tokenization server;
generating a corresponding token key for each of the respective format-preserving tokens;
replacing each of the plurality of sensitive data components in the data file with the respective format-preserving token;
cryptographically camouflaging each of the token keys according to a format-preserving encryption technique using a first password;
transmitting each of the cryptographically camouflaged token keys from the end-user device to the tokenization server; and
storing each of the cryptographically camouflaged token keys;
wherein the plurality of sensitive data components comprise a first sensitive data component associated with a first respective format-preserving token, and a second sensitive data component associated with a second respective format-preserving token, and wherein the first and second respective format-preserving tokens preserve different formats.

11. The computer of claim 10, wherein the computer-readable instructions are executable by the one or more processors to perform:
receiving a second password;
determining whether the first password is equal to the second password; and
in response to determining that the first and second password are equal:
decrypting each of the corresponding token keys; and
replacing each respective format-preserving token in the data file with the respective sensitive data components.

12. The computer of claim 10, wherein the respective format-preserving tokens are original format-preserving tokens, and wherein the computer-readable instructions are executable by the one or more processors to perform:
receiving a second password;
determining whether the first password is equal to the second password; and
in response to determining that the first and second password are not equal:
generating a new respective format-preserving token for each of the plurality of sensitive data components; and
replacing each original format-preserving token in the data file with the respective new format-preserving token.

13. The computer of claim 11, wherein determining whether the first and second passwords are equal comprises:
receiving the second password at an end-user device;
interrogating the tokenization server to determine the first password; and
comparing the second password to the first password.

14. The computer of claim 10, wherein said generating the respective format-preserving token for each of the plurality of sensitive data components is based on respective initialization vectors.

15. The computer of claim 14, wherein the data file further comprises a plurality of non-sensitive data components and wherein the respective initialization vectors are comprised of one of the non-sensitive data components.

16. The computer of claim 10, wherein the plurality of sensitive data components comprise first and second sensitive data components, and wherein the first sensitive data component comprises a valid primary account number and the second sensitive data component comprises a social security number, and wherein the first respective format-preserving token is visually indistinguishable tram a valid primary account number and the second respective format-preserving token is visually indistinguishable from a valid social security number.

17. A non-transitory computer readable storage medium storing instructions that are executable to cause a system to perform operations comprising:
receiving a security profile comprising user-defined rules for processing sensitive data in a data file;

identifying a sensitive data component in the data file according to the security profile;

generating a respective format-preserving token for the identified sensitive data component on an end-user device that is remote from a tokenization server;

generating a corresponding token key for the respective format-preserving token;

replacing the sensitive data component in the data file with the respective format-preserving token;

wherein the plurality of sensitive data components comprise a first sensitive data component associated with a first respective format-preserving token, and a second sensitive data component associated with a second respective format-preserving token, and wherein the first and second respective format-preserving tokens preserve different formats;

encrypting the corresponding token key using a format-preserving cryptographic camouflage encryption technique and a first password; and transmitting the cryptographically camouflaged token key to a tokenization server; wherein the corresponding token key for the respective format-preserving token comprises an encryption key and the respective format-preserving token.

* * * * *